United States Patent
Morrison et al.

(10) Patent No.: US 11,650,632 B2
(45) Date of Patent: May 16, 2023

(54) SYNCHRONOUS MULTI-SEGMENT HINGE FOR FOLDABLE DEVICES

(71) Applicant: Dell Products L.P., Round Rock, TX (US)

(72) Inventors: Jason Morrison, Chadron, NE (US); Chris Torres, San Marcos, TX (US)

(73) Assignee: Dell Products L.P., Round Rock, TX (US)

( * ) Notice: Subject to any disclaimer, the term of this patent is extended or adjusted under 35 U.S.C. 154(b) by 208 days.

(21) Appl. No.: 17/159,880

(22) Filed: Jan. 27, 2021

(65) Prior Publication Data

US 2022/0236772 A1 Jul. 28, 2022

(51) Int. Cl.
G06F 1/16 (2006.01)
E05D 11/08 (2006.01)
E05D 3/12 (2006.01)

(52) U.S. Cl.
CPC .......... G06F 1/1681 (2013.01); G06F 1/1641 (2013.01); *E05D 3/122* (2013.01); *E05D 11/081* (2013.01); *E05Y 2900/606* (2013.01)

(58) Field of Classification Search
CPC . G06F 1/1681; E05Y 2900/606; E05D 11/06; E05D 11/08; E05D 11/082
See application file for complete search history.

(56) References Cited

U.S. PATENT DOCUMENTS

| | | | |
|---|---|---|---|
| 10,480,225 B1 * | 11/2019 | Hsu | E05D 3/12 |
| 10,664,021 B1 * | 5/2020 | Hsu | G06F 1/1681 |
| 2010/0232100 A1 * | 9/2010 | Fukuma | H04M 1/0216 |
| | | | 361/679.01 |
| 2017/0328102 A1 * | 11/2017 | Kato | G06F 1/1681 |
| 2019/0146559 A1 * | 5/2019 | Chiang | G06F 1/1681 |
| | | | 361/809 |

* cited by examiner

*Primary Examiner* — Anthony Q Edwards
(74) *Attorney, Agent, or Firm* — Jackson Walker L.L.P.

(57) ABSTRACT

A hinge apparatus may include a plurality of plates configured to be rigidly coupled to a foldable component, and a plurality of gears mechanically coupling the plurality of plates to one another. The hinge apparatus may be operable to expand such that, when the hinge apparatus transitions from a flat state to a folded state, the plurality of gears are configured to cause the plurality of plates to translate laterally apart from one another at a selected rate.

18 Claims, 12 Drawing Sheets

SYNCHRONOUS MULTI-SEGMENT HINGE FOR FOLDABLE DEVICES

TECHNICAL FIELD

The present disclosure relates in general to information handling systems, and more particularly to a hinge for foldable devices.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Increasingly, information handling systems may include foldable components such as foldable displays. For example, phones, tablets, laptops, and other systems may include foldable organic light emitting diode (OLED) display panels that allow for large screens in a small form factor. Throughout this disclosure, the specific example of a foldable display panel is discussed for the sake of concreteness. One of ordinary skill in the art with the benefit of this disclosure will understand its applicability to other foldable components, however.

Foldable display panels are susceptible to damage during cycling of the folding mechanism, which may be caused by internal and external stresses. The front of such display panels may also be highly glossy; accordingly, any defects such as waviness, steps, gaps, etc. are likely to be easily noticed by users.

Therefore, techniques are needed for repeatably bending a foldable component in a controlled fashion for optimal performance and component life. Although this may be achieved in some embodiments by having the foldable display not fully supported by a hinge mechanism, such a solution may not provide sufficient structural support, cause problems for example when a user uses a stylus on the display. Accordingly, fully supporting a display against a backplate is desirable.

The hinges disclosed herein may solve these challenges with a multi-segment design that provides support for the panel in several locations over the full range of motion. In particular, hinge mechanisms according to this disclosure may expand at the correct rate to keep the OLED panel from experiencing tension or compression at the fold axis. In some embodiments, this expansion may occur at a selected rate (e.g., causing a particular lateral expansion distance per angular degree of folding). For example, in some embodiments, the hinge may be able to attain a flat state without gaps, in which the segments are not laterally spaced apart. As the hinge is folded, gaps may be created between the segments and may grow at a desired rate. In some embodiments, this may allow for the length of the panel to remain constant during bending, such that the hinge expands at the correct rate to allow that to happen.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with hinges for foldable devices may be reduced or eliminated.

In accordance with embodiments of the present disclosure, a hinge apparatus may include a plurality of plates configured to be rigidly coupled to a foldable component, and a plurality of gears mechanically coupling the plurality of plates to one another. The hinge apparatus may be operable to expand such that, when the hinge apparatus transitions from a flat state to a folded state, the plurality of gears are configured to cause the plurality of plates to translate laterally apart from one another at a selected rate.

In accordance with these and other embodiments of the present disclosure, a method may include coupling a plurality of plates to one another via a plurality of gears to create a hinge apparatus; and rigidly coupling the plurality of plates to a foldable component. The hinge apparatus may be operable to expand such that, when the hinge apparatus transitions from a flat state to a folded state, the plurality of gears are configured to cause the plurality of plates to translate laterally apart from one another at a selected rate.

In accordance with these and other embodiments of the present disclosure, an information handling system may include a foldable display panel and a hinge apparatus rigidly coupled to the foldable display panel. The hinge apparatus may include a plurality of plates and a plurality of gears mechanically coupling the plurality of plates to one another. The hinge apparatus may be operable to expand such that, when the hinge apparatus transitions from a flat state to a folded state, the plurality of gears are configured to cause the plurality of plates to translate laterally apart from one another at a selected rate.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
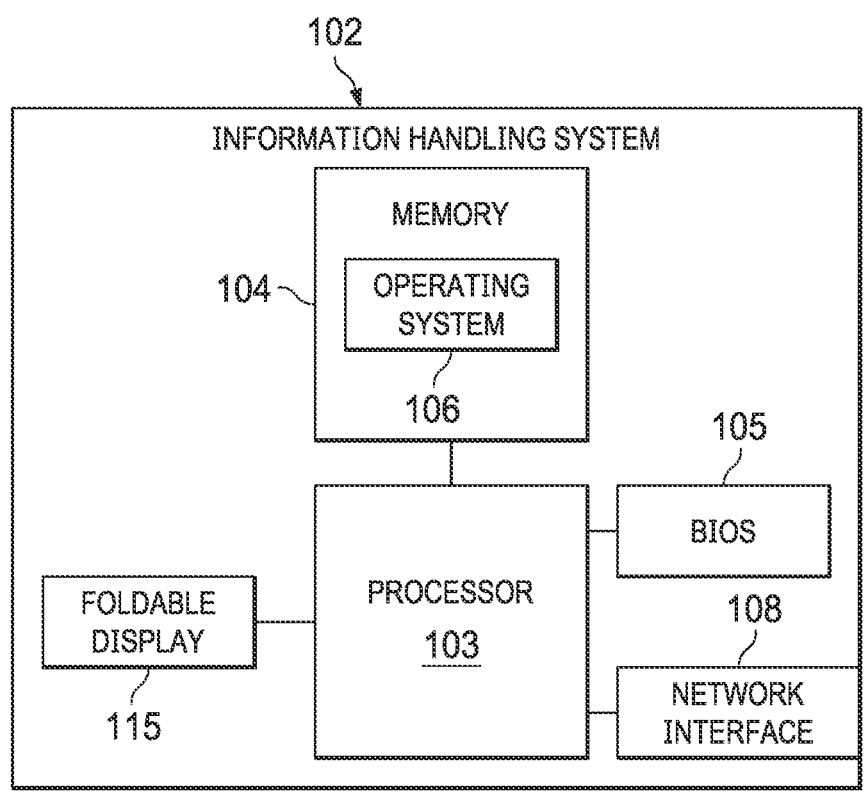
FIG. 1 illustrates a block diagram of an example information handling system, in accordance with embodiments of the present disclosure.

Preferred embodiments and their advantages are best understood by reference to FIGS. 1 through 7C, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Information handling system 102 may further include a foldable component such as foldable display 115. As discussed above, if foldable display were attached to a standard hinge to allow such folding, then foldable display 115 would experience compression and/or shear forces due to its non-zero thickness (e.g., due to the distance between the hinge and the front face of foldable display 115). Accordingly, it is desirable to be able to fold foldable display 115 in such a way that it does not experience any such compression or shear forces.

Some embodiments of this disclosure may achieve the desired motion by employing selected gear ratios between various components of an expandable hinge. A series of rotations and translations between parts may constrain the motion of all joints to produce repeatable, controlled motion, allowing the hinge to expand by the amount needed to prevent foldable display 115 from experiencing compression or shear (or tension) forces.

Different gear ratios may be used in different embodiments, because the exact expansion characteristics that are desired may vary from one type of foldable display to another. Leadscrews may advantageously be used in some embodiments, because they provide a way to fine tune a gear ratio without modifying the diameter of the gear (with spur gears, for example, the diameter of the gear would change when the gear ratio changed). Thus different expansion characteristics may be created as desired by changing gear ratios, without the need to completely redesign a hinge. For purposes of this disclosure, the general term "gears" may be understood to refer to leadscrews, leadscrew nuts, spur gears, and other types of gears.

Figure 2A:
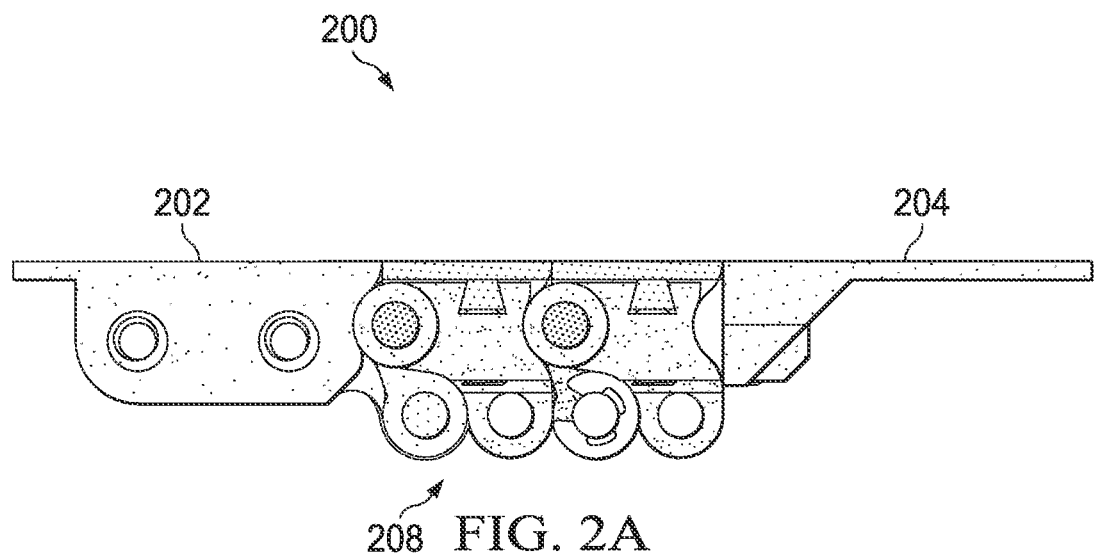
FIGS. 2A-2D illustrate several views of a hinge, in accordance with embodiments of the present disclosure.
Figure 2B:
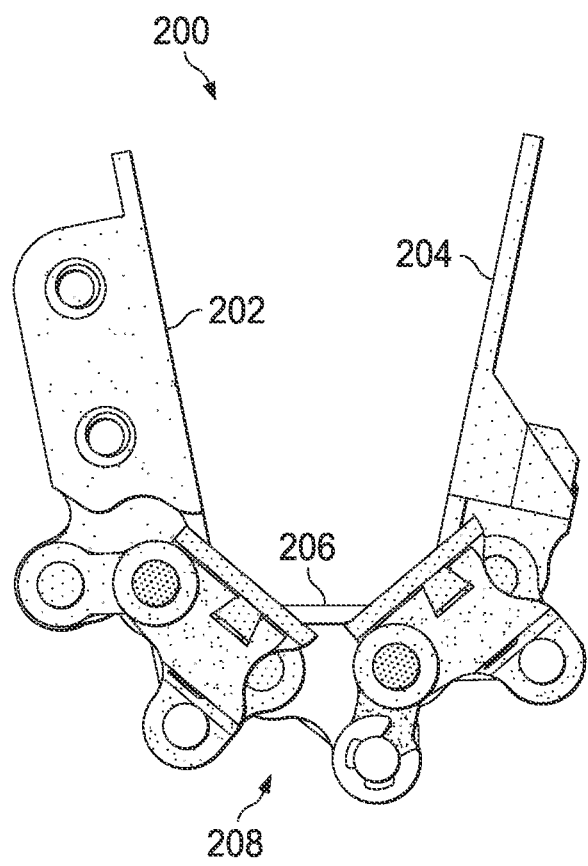
Figure 2C:
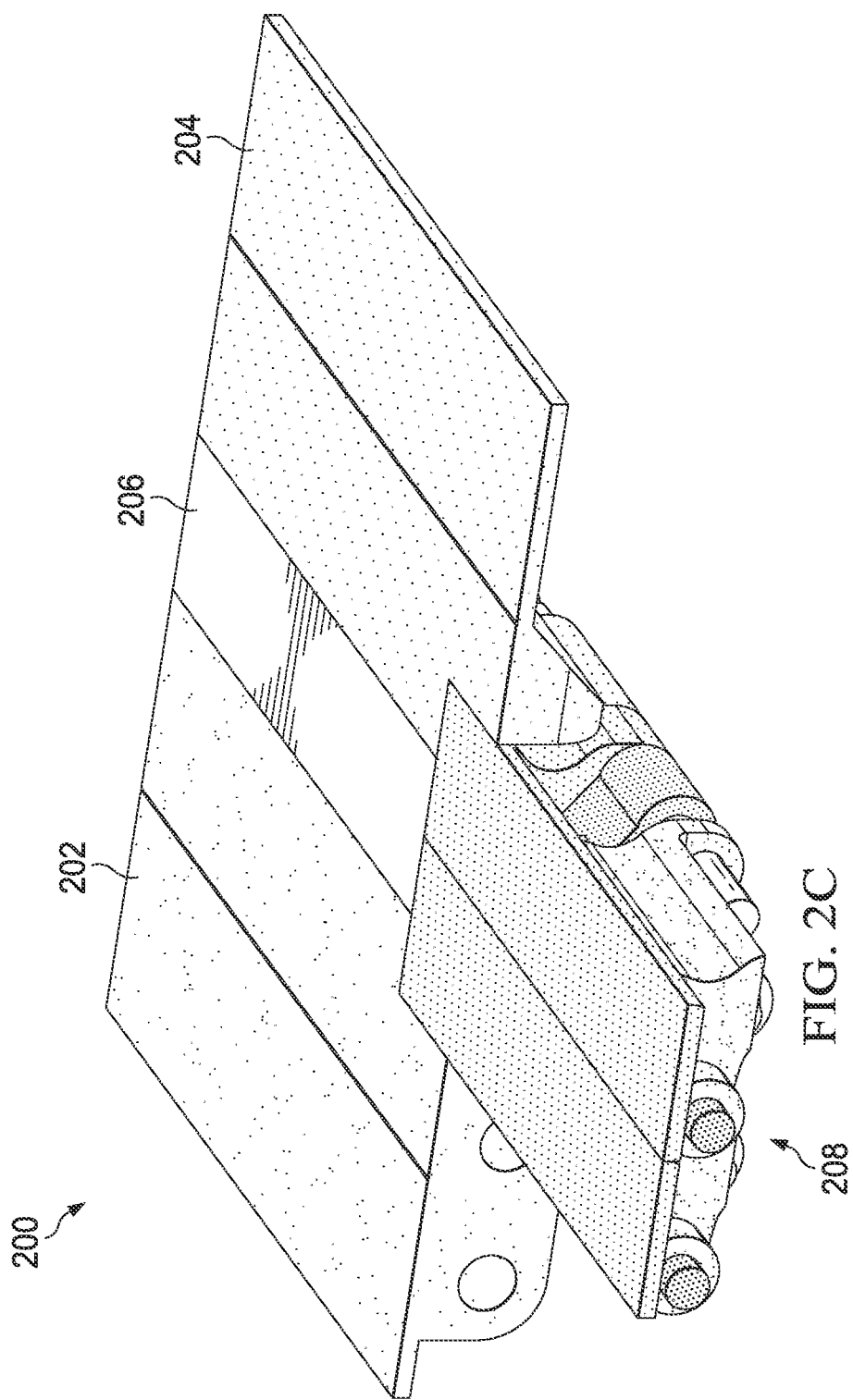
Figure 2D:
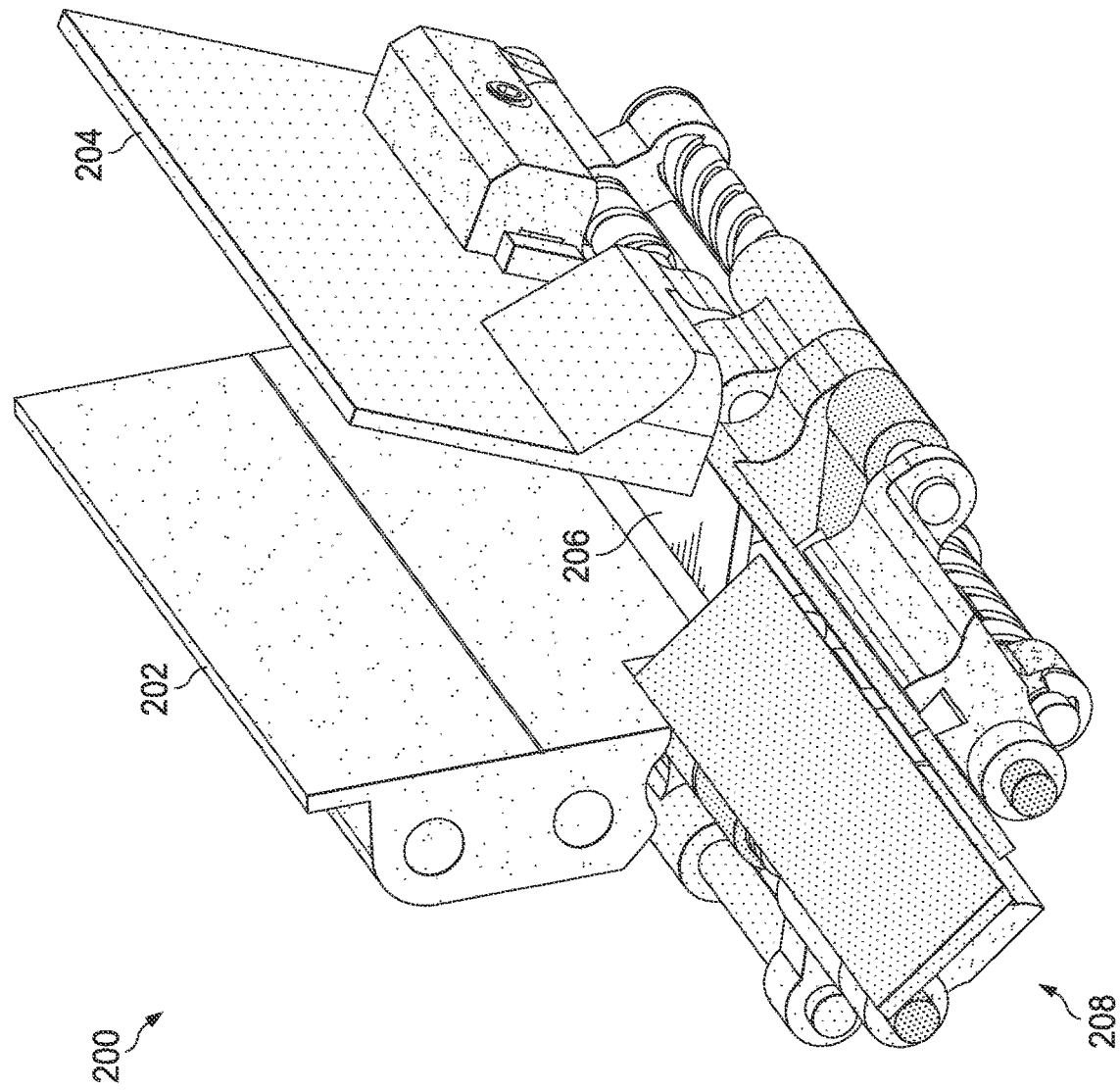

Turning now to FIGS. 2A-2D, several views are shown of a hinge 200. FIG. 2A provides a side view of hinge 200 in a flat configuration. FIG. 2B provides a side view of hinge 200 in a folded configuration. FIG. 2C provides a perspective view of hinge 200 in a flat configuration. FIG. 2D provides a perspective view of hinge 200 in a folded configuration.

Hinge 200 may include side plates 202 and 204, which may be configured to hinge upwardly away from center plate 206. Hinge mechanism 208 (discussed in more detail below) may allow for desired amounts of separation to be created between center plate 206 and side plates 202 and 204, respectively. These separations are visible in FIG. 2D.

Figure 3:
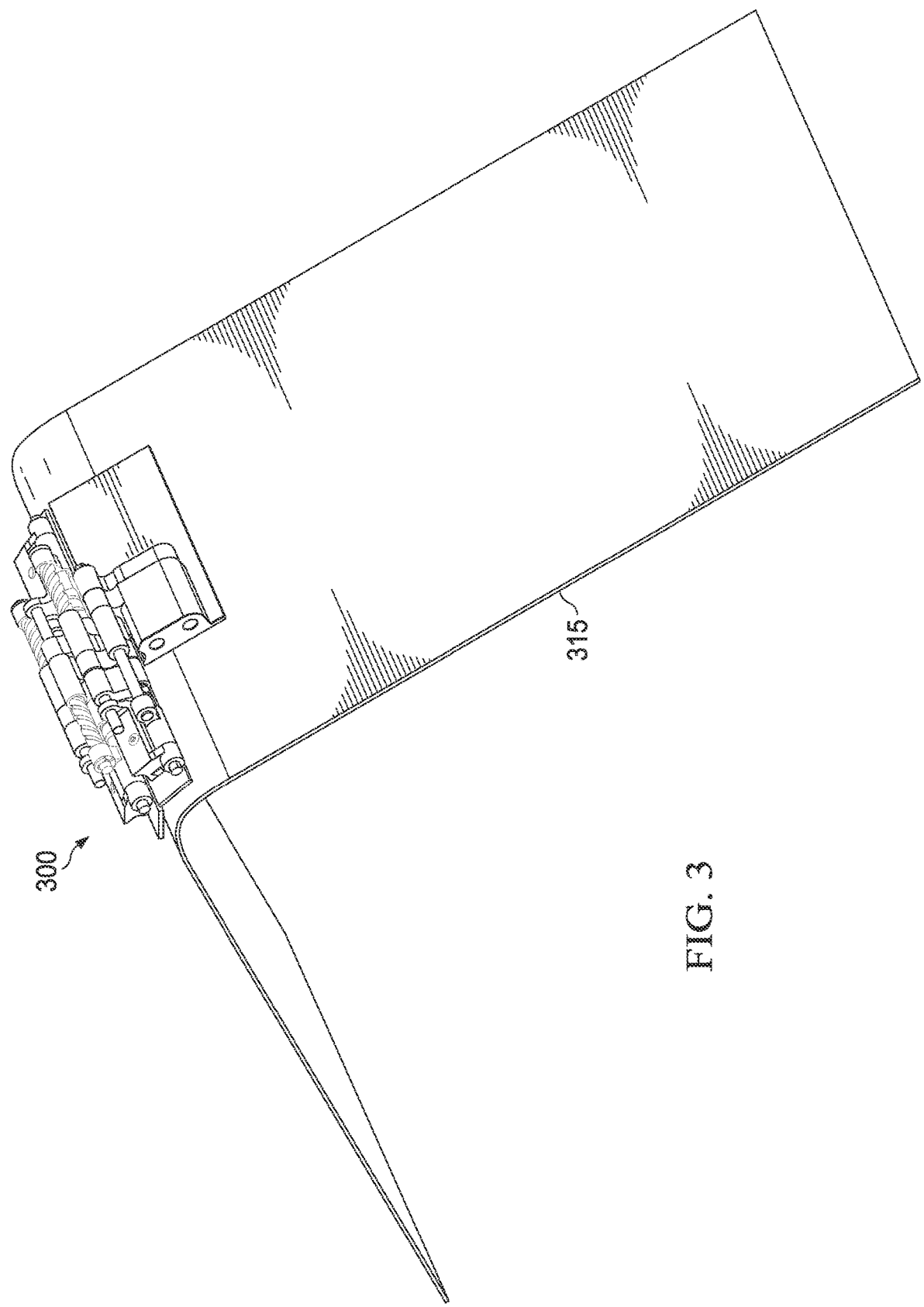
FIG. 3 illustrates a hinge attached to a display panel, in accordance with embodiments of the present disclosure.

FIG. 3 shows an embodiment in which hinge 300 (generally similar to hinge 200) is attached to foldable display 315. Depending on the size and shape of foldable display 315, as well as the desired overall dimensions of a device including display 315, more than one such hinge 300 may be used in some embodiments. For example, in embodiments in which the fold axis is long relative to the size of hinge 300, two or more hinges 300 may be spaced along the fold axis to provide additional support. In some embodiments, such additional hinges may be spaced apart to allow for convenient cable routing.

Figure 4A:
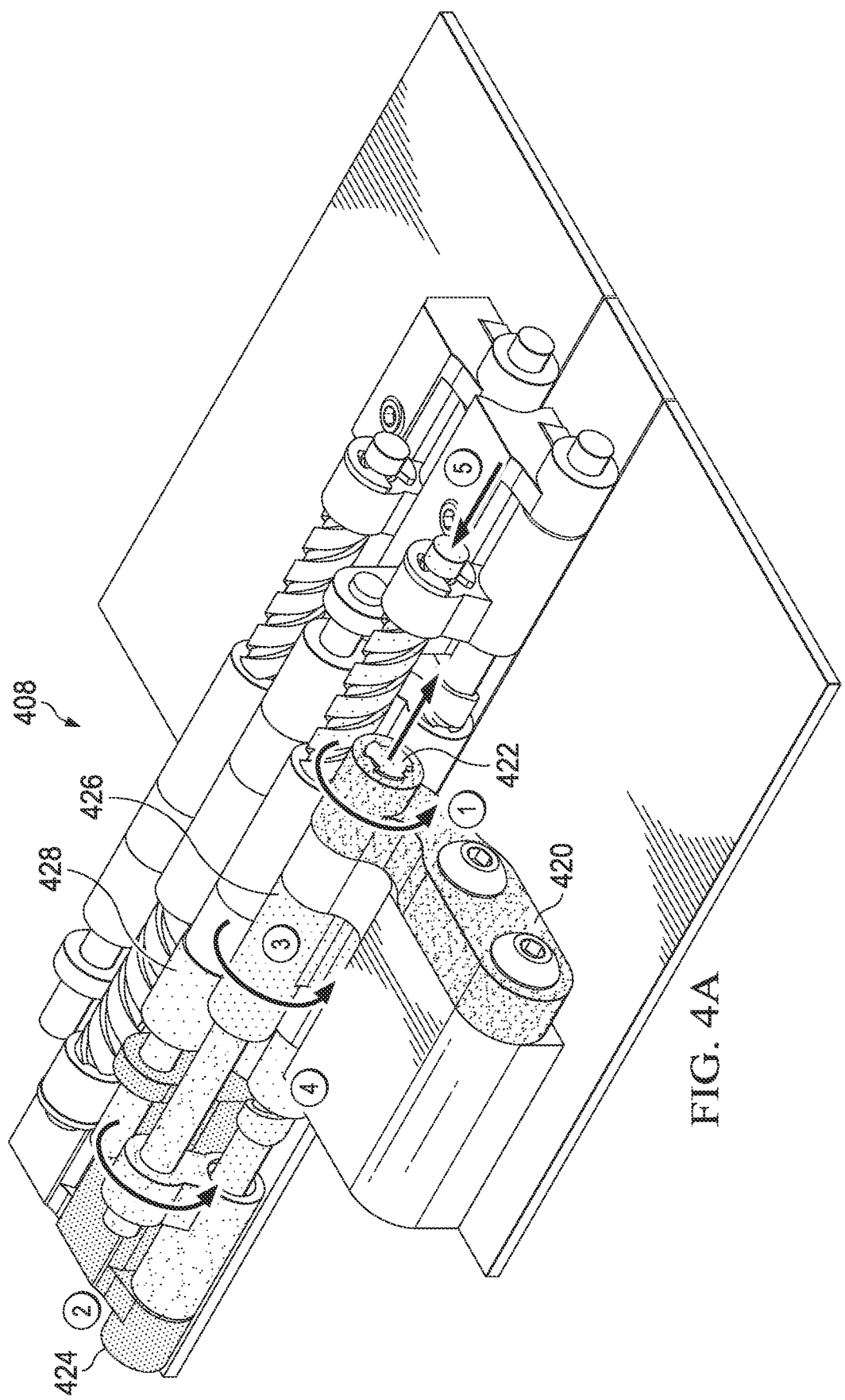
FIGS. 4A and 4B illustrate the mechanism of operation of a hinge, in accordance with embodiments of the present disclosure.
Figure 4B:
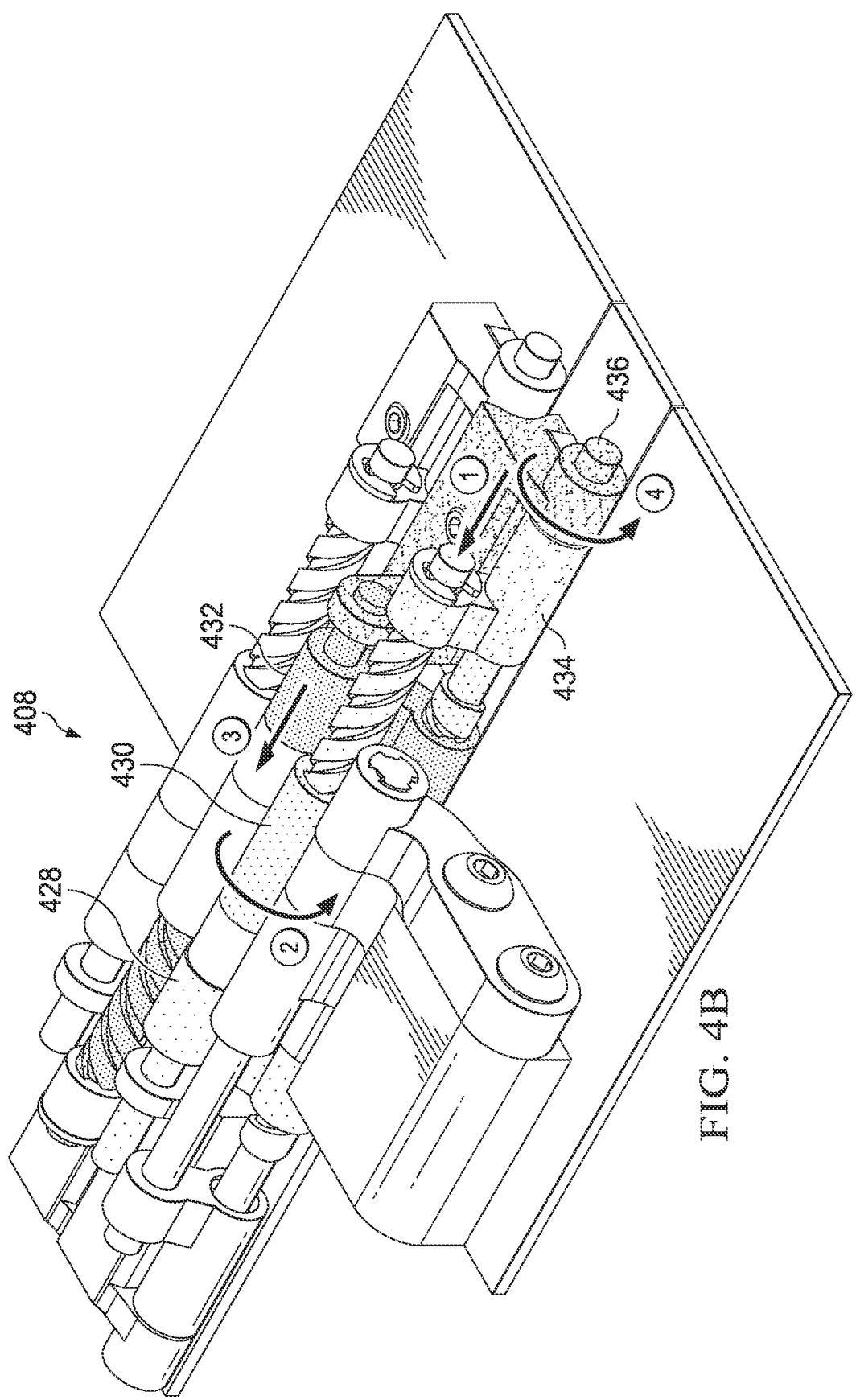

Turning now to FIGS. 4A and 4B, perspective views are shown of hinge 400 including hinge mechanism 408 (which is generally similar to hinge mechanism 208 discussed above). FIGS. 4A and 4B also illustrate the motions of various components of hinge mechanism 408 as hinge 400 is moved from a flat configuration to a folded configuration.

The gear relationships described with respect to FIGS. 4A and 4B may create a loop of influence between all axes. To facilitate understanding of the relationships between components, the movement of hinge 400 will be discussed in stages, but in practice, the movements of all stages may occur simultaneously to control all degrees of freedom and provide predictable motion.

As shown at step 1 of FIG. 4A, as hinge 400 begins to fold, the rotation of bracket 420 may cause leadscrew assembly 422 to translate as indicated by the illustrated arrows.

At step 2, the translation of leadscrew assembly 422 relative to assembly 424 may cause assembly 424 to rotate. The angle between leadscrew assembly 422 and assembly 424 thus may change.

As shown at step 3, the angle of assembly 426 is constant with respect to leadscrew assembly 422. The angle of assembly 428 is constant with respect to assembly 424. Accordingly, the angle change between assemblies 422 and 424 is also the same as the angle change between assemblies 426 and 428.

At step 4, the rotation between assemblies 426 and 428 may also cause assembly 428 to translate. This translation of assembly 428 is the input for the next stage hinge 400, as shown at FIG. 4B.

Turning now to FIG. 4B, at step 1, assembly 428 translates.

At step 2, the translation of assembly 428 along a leadscrew nut of assembly 430 may force assembly 430 to rotate.

At step 3, the rotation of assembly 430 may force assembly 432 to translate. This translation is the input for the next stage of hinge 400, if any. (For the sake of clarity and exposition, additional stages are not discussed in detail with respect to FIGS. 4A and 4B.)

As shown at step 4, the translation of assembly 428 also forces translation of assembly 434. The translation of assembly 434 causes rotation of assembly 436.

At step 5, the translation of assembly 434 relative to assembly 436 causes assembly 436 to rotate.

As noted above, hinges according to this disclosure may include thread pitches and/or gear ratios and/or components sizes that are selected to provide a desired amount of expansion. As one example that has been found to give satisfactory results with a particular type of foldable display panel, the leadscrew of assembly 430 may have a 2 mm outer diameter and a 2 mm thread pitch; the leadscrew of assembly 428 may have a 2 mm outer diameter and a 5.3 mm thread pitch. However, the exact dimensions, thread pitches, and/or gear ratios may be tuned to give satisfactory results for any given foldable component.

Figure 5A:
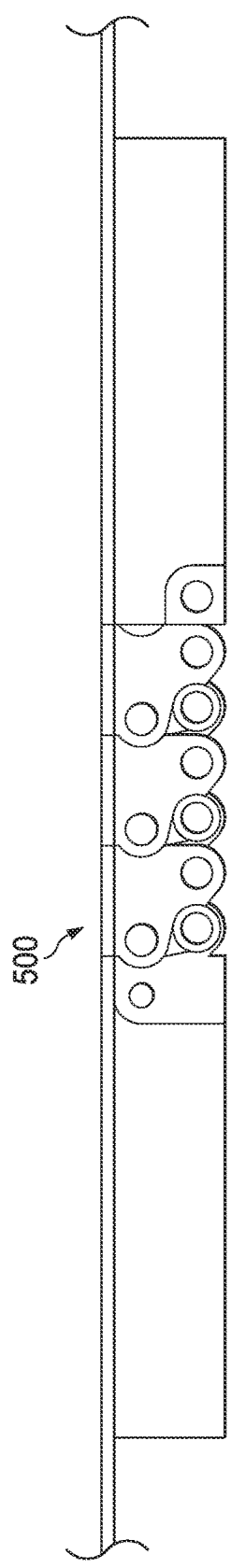
FIGS. 5A and 5B illustrate views of a hinge, in accordance with embodiments of the present disclosure.
Figure 5B:
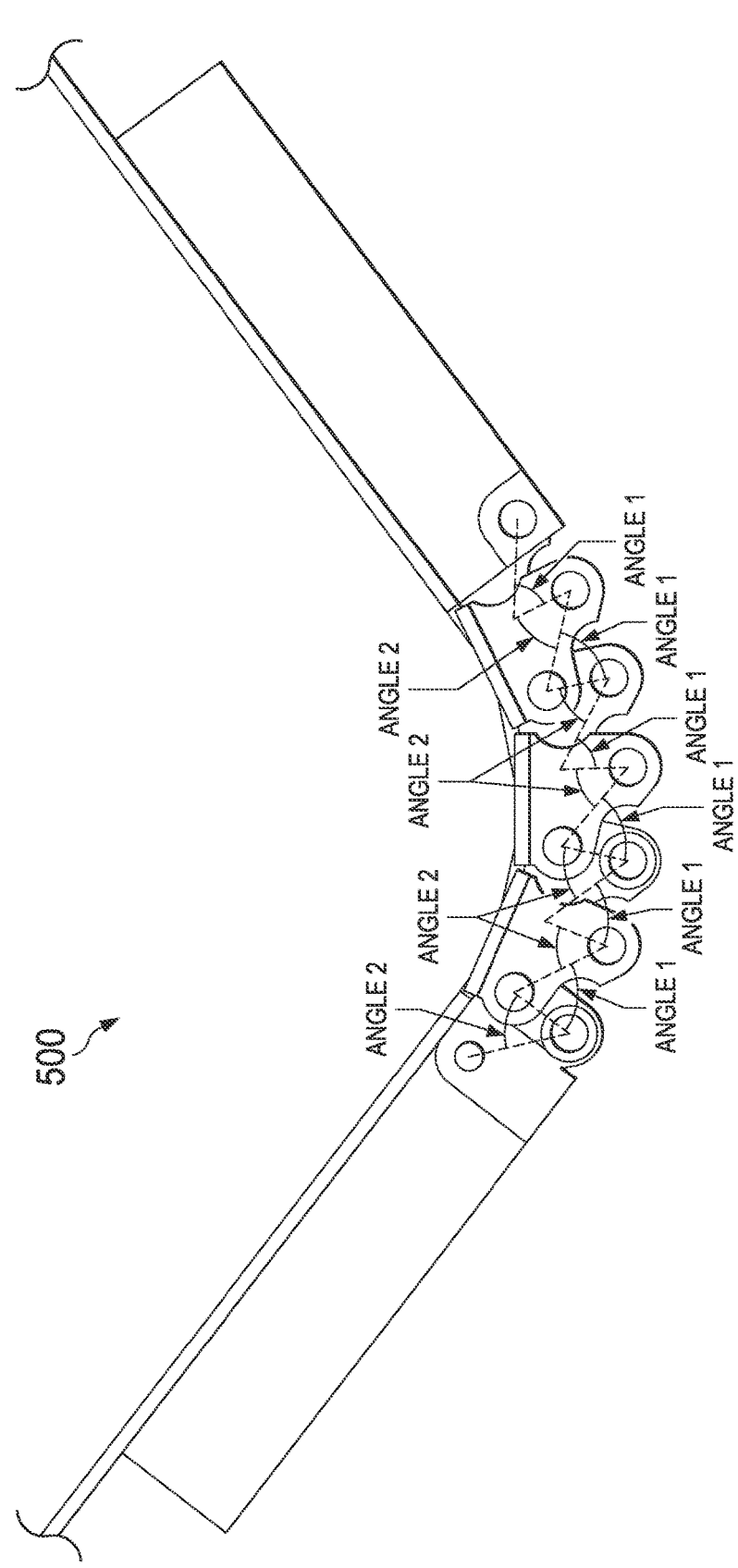

As noted above, in some embodiments, a hinge according to this disclosure may include any desired number of stages. FIGS. 5A and 5B show an embodiment with additional stages.

FIG. 5A shows a side view of hinge 500 in a flat configuration. FIG. 5B shows a side view of hinge 500 in a partially folded configuration.

In particular, the additional stages of hinge 500 may be repeats of the previous stages (e.g., copies of the stages discussed in detail with respect to FIGS. 4A and 4B). Thus embodiments may allow for precise control of every joint angle, synchronizing each joint to two others.

The mechanisms discussed herein may be scaled to accommodate different desired inside bend radii to work within the requirements of different types of foldable displays. As the bend radius changes, additional links/stages can be added as needed, and the ratios between angle 1 and angle 2 (shown in FIG. 5B) may be tuned by varying the thread pitch of the leads crews.

In some embodiments, it may also be desirable to construct a hinge such that it will tend to remain in a given orientation (e.g., flat, folded, or partially folded) when a user places it in such orientation. Although the interactions between the various components discussed above with respect to FIGS. 4A and 4B may provide some friction, additional friction may be desired in some embodiments.

Figure 6:
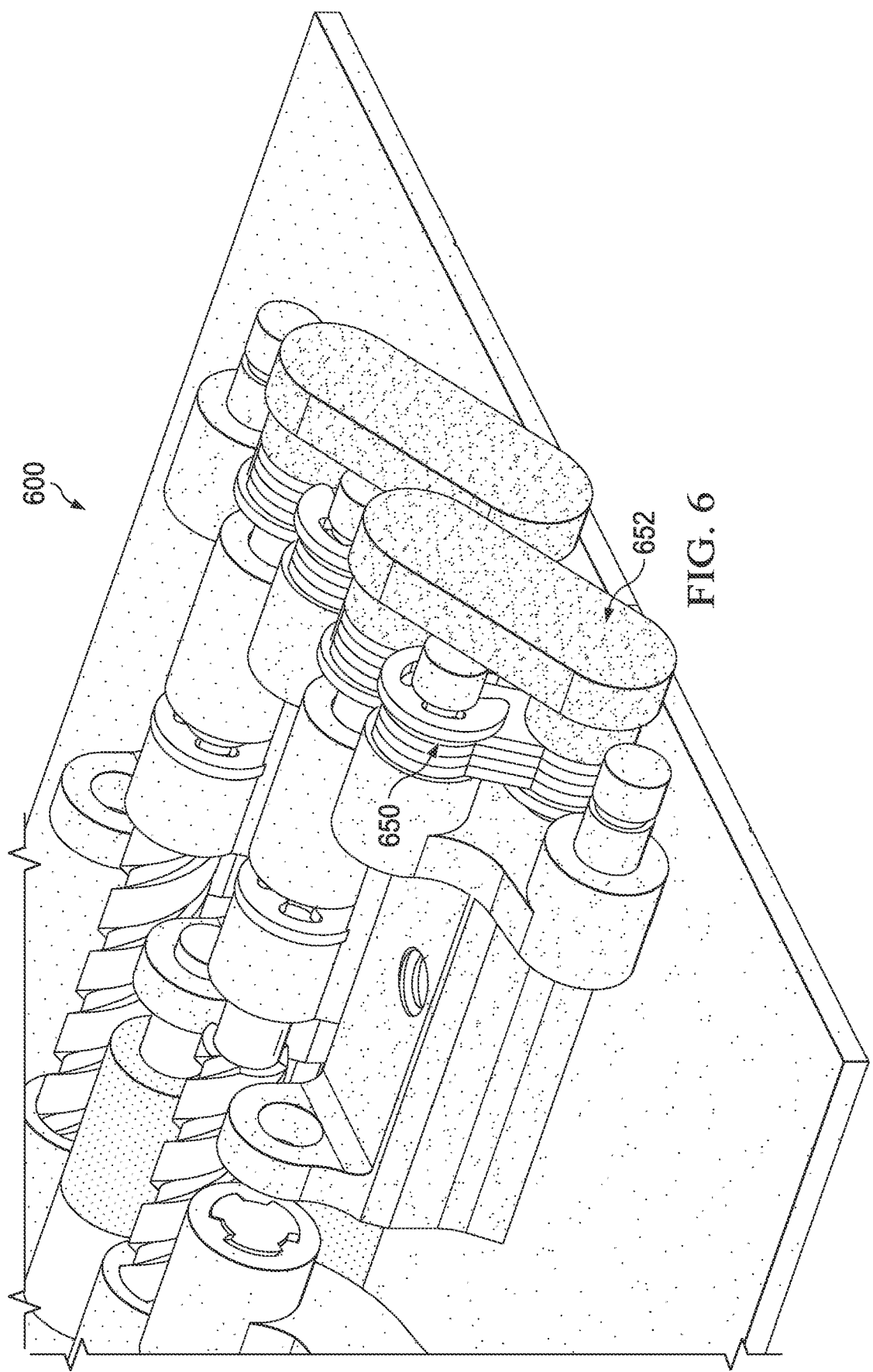
FIG. 6 illustrates a hinge with additional friction components, in accordance with embodiments of the present disclosure.

Accordingly, FIG. 6 illustrates a detail view of a portion of hinge 600 which includes additional elements to generate friction and allow hinge 600 to maintain a desired orientation. As shown, torque plates 650 may apply static and/or dynamic friction to any desired component of hinge 600. In these and other embodiments, torque links 652 may apply static and/or dynamic friction to linkages between any desired components of hinge 600.

Figure 7A:
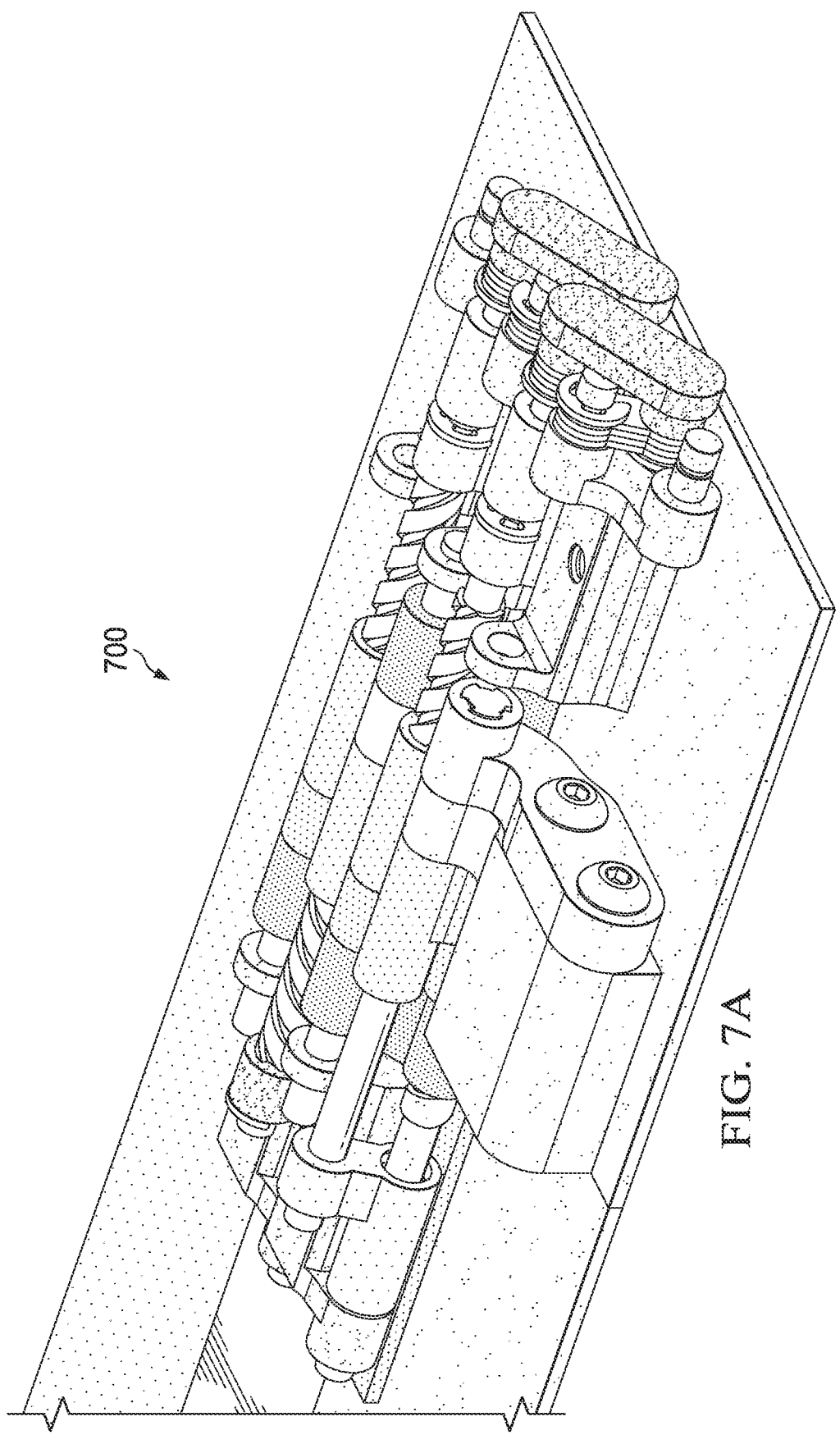
FIGS. 7A-7C illustrate several views of a hinge, in accordance with embodiments of the present disclosure.
Figure 7B:
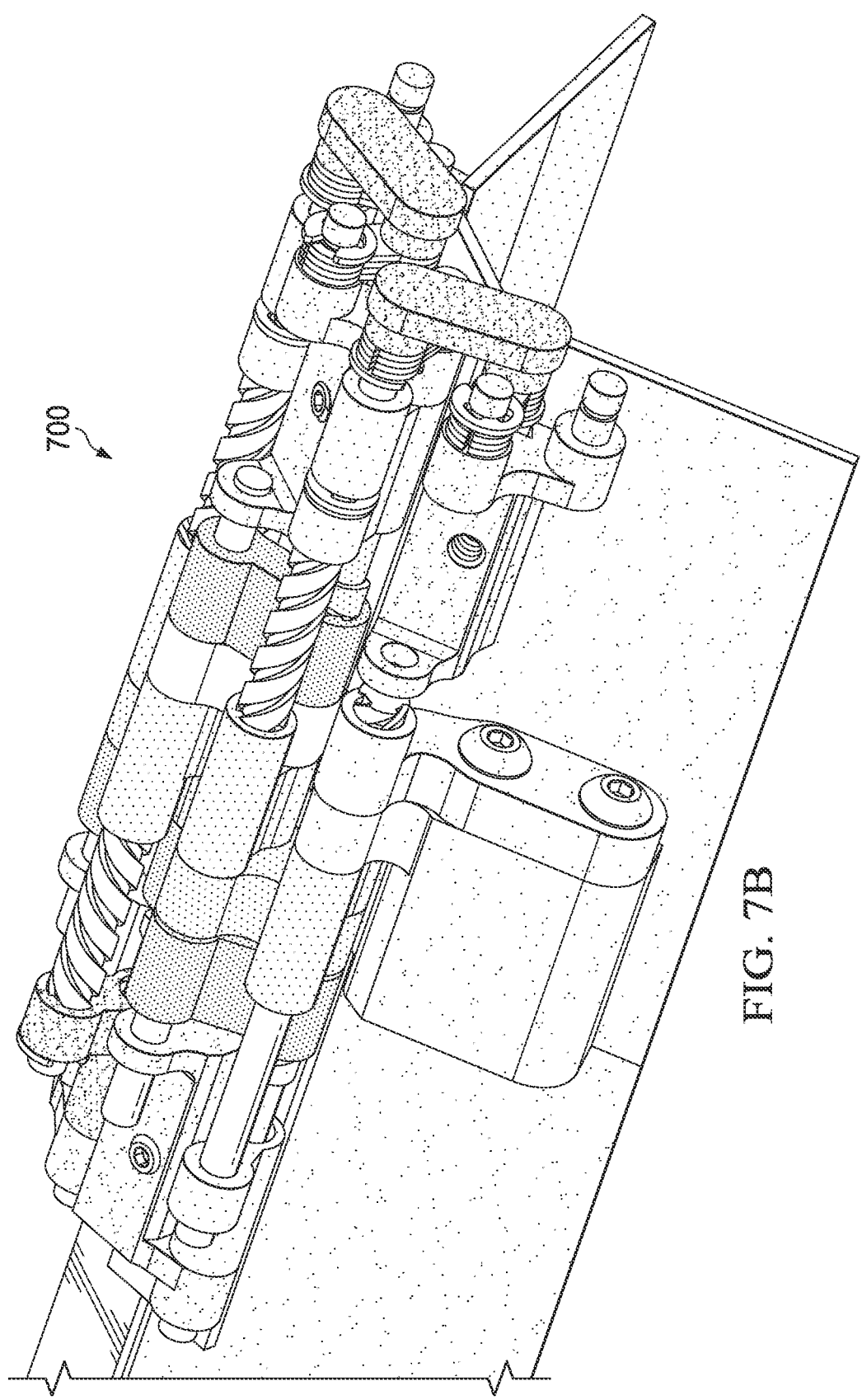
Figure 7C:
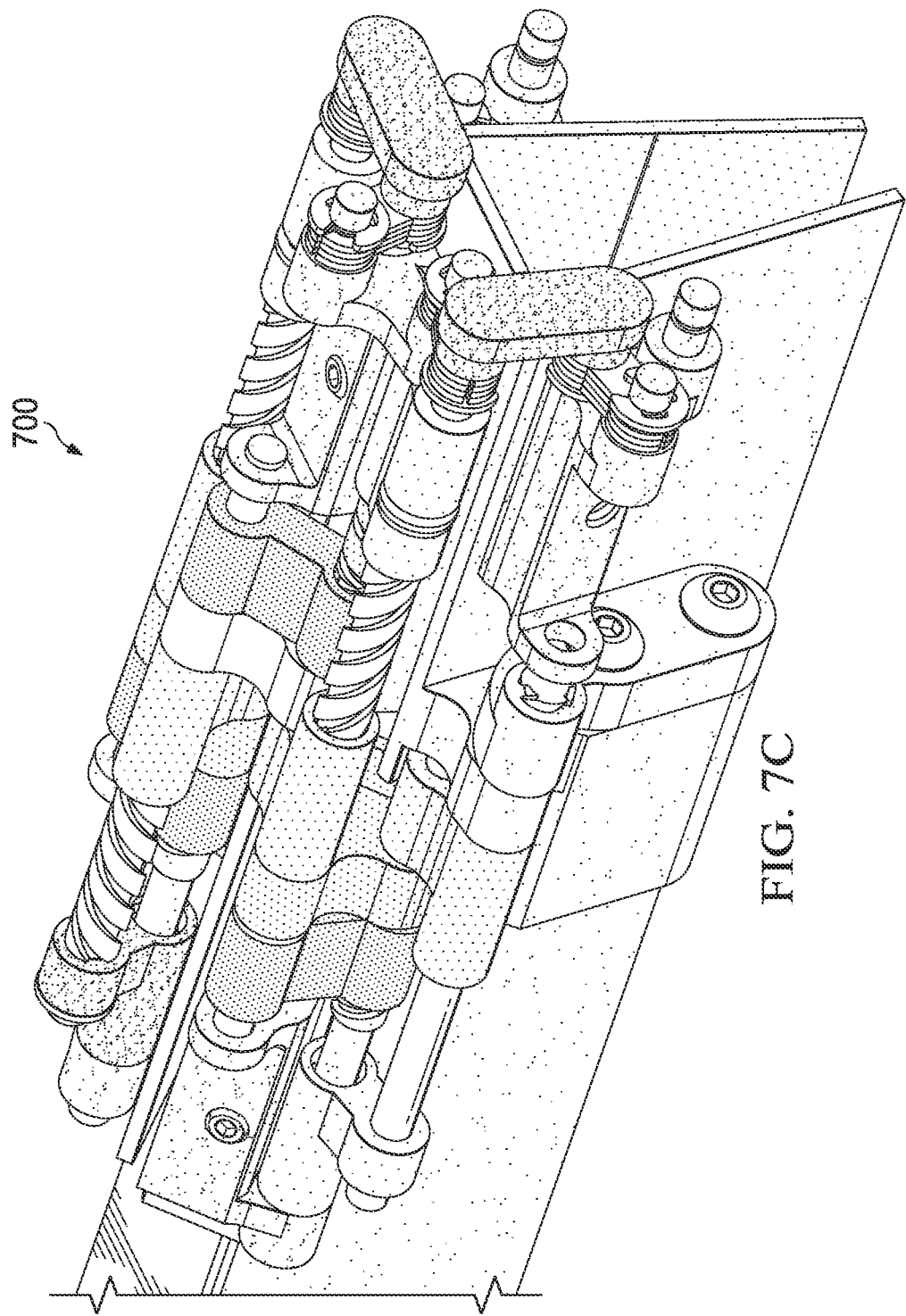

Turning now to FIGS. 7A-7C, some additional views of a hinge are shown. FIG. 7A shows a perspective view of hinge 700 in a flat (or open) position. FIG. 7B shows a perspective view of hinge 700 in partially folded position. FIG. 7C shows a perspective view of hinge 700 in a folded (or closed) position. Hinge 700 may be generally similar in construction to the hinges discussed above, and so for the sake of brevity, its components and their various relationships are not discussed in detail with respect to FIGS. 7A-7C.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Unless otherwise specifically noted, articles depicted in the drawings are not necessarily drawn to scale. However, in some embodiments, articles depicted in the drawings may be to scale.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. A hinge apparatus comprising:
   a plurality of plates configured to be rigidly coupled to a foldable component; and
   a plurality of gears mechanically coupling the plurality of plates to one another;
   wherein the hinge apparatus is operable to expand such that, when the hinge apparatus transitions from a flat state to a folded state, the plurality of gears are configured to cause the plurality of plates to translate laterally apart from one another at a selected rate; and
   wherein, when the hinge apparatus is in the flat state, the plurality of plates are in contact with one another, without gaps therebetween.

2. The hinge apparatus of claim 1, wherein the foldable component is a display panel.

3. The hinge apparatus of claim 2, wherein the display panel is an organic light emitting diode (OLED) display panel.

4. The hinge apparatus of claim 1, wherein the plurality of plates includes a center plate configured to be aligned along a fold axis of the foldable component.

5. The hinge apparatus of claim 4, wherein the plurality of plates further includes two side plates laterally displaced from the center plate.

6. The hinge apparatus of claim 1, wherein the hinge apparatus is further operable to contract such that, when the hinge apparatus transitions from the folded state to the flat state, the plurality of gears are configured to cause the plurality of plates to translate laterally together toward one another at the selected rate.

7. The hinge apparatus of claim 1, wherein the selected rate is selected such that when the plurality of plates are rigidly coupled to a back surface of a particular foldable component and when the hinge apparatus transitions from the flat state to the folded state, a front surface of the foldable component experiences no compression or tension forces.

8. A method comprising:
   coupling a plurality of plates to one another via a plurality of gears to create a hinge apparatus; and
   rigidly coupling the plurality of plates to a foldable component;
   wherein the hinge apparatus is operable to expand such that, when the hinge apparatus transitions from a flat state to a folded state, the plurality of gears are configured to cause the plurality of plates to translate laterally apart from one another at a selected rate; and
   wherein, when the hinge apparatus is in the flat state, the plurality of plates are in contact with one another, without gaps therebetween.

9. The method of claim 8, further comprising: coupling a friction-generating component to at least one of the plurality of gears.

10. The method of claim 9, wherein the friction-generating component is configured to generate sufficient friction to maintain the hinge apparatus in a particular orientation.

11. The method of claim 8, wherein the plurality of gears includes a plurality of leadscrews.

12. An information handling system comprising:
a foldable display panel;
a hinge apparatus rigidly coupled to the foldable display panel;
wherein the hinge apparatus includes:
  a plurality of plates; and
  a plurality of gears mechanically coupling the plurality of plates to one another;
wherein the hinge apparatus is operable to expand such that, when the hinge apparatus transitions from a flat state to a folded state, the plurality of gears are configured to cause the plurality of plates to translate laterally apart from one another at a selected rate; and
wherein, when the hinge apparatus is in the flat state, the plurality of plates are in contact with one another, without gaps therebetween.

13. The information handling system of claim 12, wherein the plurality of gears includes a plurality of leadscrews and a plurality of leadscrew nuts.

14. The information handling system of claim 13, wherein the display panel is an organic light emitting diode (OLED) display panel.

15. The information handling system of claim 12, wherein the plurality of plates includes a center plate configured to be aligned along a fold axis of the foldable display panel.

16. The information handling system of claim 15, wherein the plurality of plates further includes two side plates laterally displaced from the center plate.

17. The information handling system of claim 12, wherein the hinge apparatus is further operable to contract such that, when the hinge apparatus transitions from the folded state to the flat state, the plurality of gears are configured to cause the plurality of plates to translate laterally together toward one another at the selected rate.

18. The information handling system of claim 12, wherein the selected rate is selected such that when the hinge apparatus transitions from the flat state to the folded state, a front surface of the foldable display panel experiences no compression or tension forces.

* * * * *